US012216760B2

(12) United States Patent
Kumar et al.

(10) Patent No.: US 12,216,760 B2
(45) Date of Patent: Feb. 4, 2025

(54) METHOD AND APPARATUS TO IDENTIFY CREATOR OF COM PROCESS CREATED USING OLE AUTOMATION

(71) Applicant: Musarubra US LLC, Plano, TX (US)

(72) Inventors: Manish Kumar, Cork (IE); Jonathan L. Edwards, Portland, OR (US)

(73) Assignee: Musarubra US LLC, San Jose, CA (US)

( * ) Notice: Subject to any disclaimer, the term of this patent is extended or adjusted under 35 U.S.C. 154(b) by 268 days.

(21) Appl. No.: 17/514,437

(22) Filed: Oct. 29, 2021

(65) Prior Publication Data

US 2023/0136586 A1 May 4, 2023

(51) Int. Cl.
*G06F 21/56* (2013.01)
(52) U.S. Cl.
CPC ........ *G06F 21/56* (2013.01); *G06F 2221/033* (2013.01)
(58) Field of Classification Search
None
See application file for complete search history.

(56) References Cited

U.S. PATENT DOCUMENTS

| 9,690,606 | B1* | 6/2017 | Ha ...................... G06F 9/45558 |
| 9,894,085 | B1* | 2/2018 | Dmitriyev ............. G06F 21/554 |
| 10,546,125 | B1* | 1/2020 | Zeng ..................... G06F 21/563 |
| 11,409,871 | B1* | 8/2022 | Naamneh .............. G06F 21/556 |
| 2010/0037317 | A1* | 2/2010 | Oh ......................... G06F 21/554 726/23 |
| 2021/0112082 | A1* | 4/2021 | Carlson ............... H04L 63/1433 |

* cited by examiner

*Primary Examiner* — Philip J Chea
*Assistant Examiner* — James Ross Hollister
(74) *Attorney, Agent, or Firm* — HANLEY, FLIGHT & ZIMMERMAN, LLC (57) ABSTRACT

An apparatus includes a memory that stores instructions; and a processing unit that executes the instructions to identify a created process, to receive a notification of a first event for an ancestor process and a notification for a second event for the created process, the notification of the first event indicating a first ActivityID and a first ID, the notification of the second event indicating a second ActivityID and a second ID, the first ID being different from the second ID, to perform a first determination that the created process was created by a component object model (COM) call, at least in part based on the second ID, and to perform a second determination that the ancestor process indirectly created the created process, at least in part based on the first and second ActivityIDs and the first determination.

20 Claims, 7 Drawing Sheets

| ActivityID | Event | Process | Timestamp | Notification |
|---|---|---|---|---|
| 234 | CCS | Powershell | 1909 | Event 1 |
|  | CER | Winword | 3000 | Event 2 |
|  | CIR | Winword | 5000 | Event 3 |
|  | CCF | Powershell | 7219 | Event 4 |
|  | Other |  |  | Event 5 |

METHOD AND APPARATUS TO IDENTIFY CREATOR OF COM PROCESS CREATED USING OLE AUTOMATION

BACKGROUND

Technical Field

This disclosure relates to computer malware detection or handling and, in particular, to attributing an indirectly-created process to its indirect creator.

Related Art

Many computing devices, such as laptop computers and smartphones, use the popular Microsoft® Windows® operating system (OS). Windows® includes technologies such as a component object model (COM) that enables creation of communication objects. Windows® also includes an object linking and embedding technology (OLE). Applications in Windows® can communicate using remote procedure call (RPC) messages, based on a client and server model. Further, Windows® implements Event Tracing for Windows (ETW) for tracing and logging events.

Such computing devices are plagued with malicious software ("malware"). In many cases, malware will be executable objects such as, by way of non-limiting examples, viruses, Trojans, zombies, rootkits, backdoors, worms, spyware, adware, ransomware, dialers, payloads, malicious browser helper objects, tracking cookies, loggers, or similar objects designed to take a potentially unwanted action. These actions include, by way of non-limiting examples, data destruction, covert data collection, browser hijacking, network proxy or redirection, covert tracking, data logging, keylogging, excessive or deliberate barriers to removal, contact harvesting, and unauthorized self-propagation.

BRIEF SUMMARY

In one implementation of the present disclosure, an apparatus includes a memory that stores instructions; and a processing unit configured to execute the instructions to identify a created process, to receive a notification of a first event for an ancestor process and a notification for a second event for the created process, the notification of the first event indicating a first ActivityID and a first ID, the notification of the second event indicating a second ActivityID and a second ID, the first ID being different from the second ID, to perform a first determination that the created process was created by a component object model (COM) call, at least in part based on the second ID, and to perform a second determination that the ancestor process indirectly created the created process, at least in part based on the first and second ActivityIDs and the first determination.

BRIEF DESCRIPTION OF THE SEVERAL VIEWS OF THE DRAWINGS

FIG. 2A illustrates an example of an event notification received in some implementations of the present disclosure.

DETAILED DESCRIPTION

In many situations, an OS event can be either benign or malicious. The OS event represents an activity being performed in the OS. Computer security products determine whether the activity is malicious or benign, at least in part based on the actor behind the events. Thus, many computer security products are interested in knowing the actor for an event.

To frustrate these products, malicious processes commonly have other processes do the "dirty work" for the malicious processes. For example, a malicious process might seek to encrypt a file. If the malicious process itself encrypts the file, a computer security product might detect the process. Therefore, to elude detection, the malicious process might create a new process to perform the actual encryption of the file.

However, computer security products easily can detect if the malicious process directly creates a child process to perform the encryption. Therefore, some malware takes an additional step to hide this information by indirectly creating a child process, such that the actor appears to the computer security product to be a common system service. Accordingly, the encryption appears to be performed by a process whose entire hierarchy (e.g., the parent process and the process itself) appears to be legitimate.

One such method of indirect creation is by use of Microsoft® COM technology through the OLE Automation framework of interfaces.

For purposes of illustrating the present innovation, it might be useful to understand phenomena relevant to various implementations thereof. The following foundational information can be viewed as a basis from which the present disclosure properly can be explained. Such information is offered for purposes of explanation only and, accordingly, should not be construed in any way to limit the broad scope of the present disclosure and its potential applications.

Existing solutions rely on various techniques to establish an indirect relationship across two process trees: by monitoring the process creation command lines combined with timing correlations, by hooking processes, and so on. These solutions can be complex and yet still fail to cover all cases or can be intrusive by way of hooking system processes.

Figure 1A:
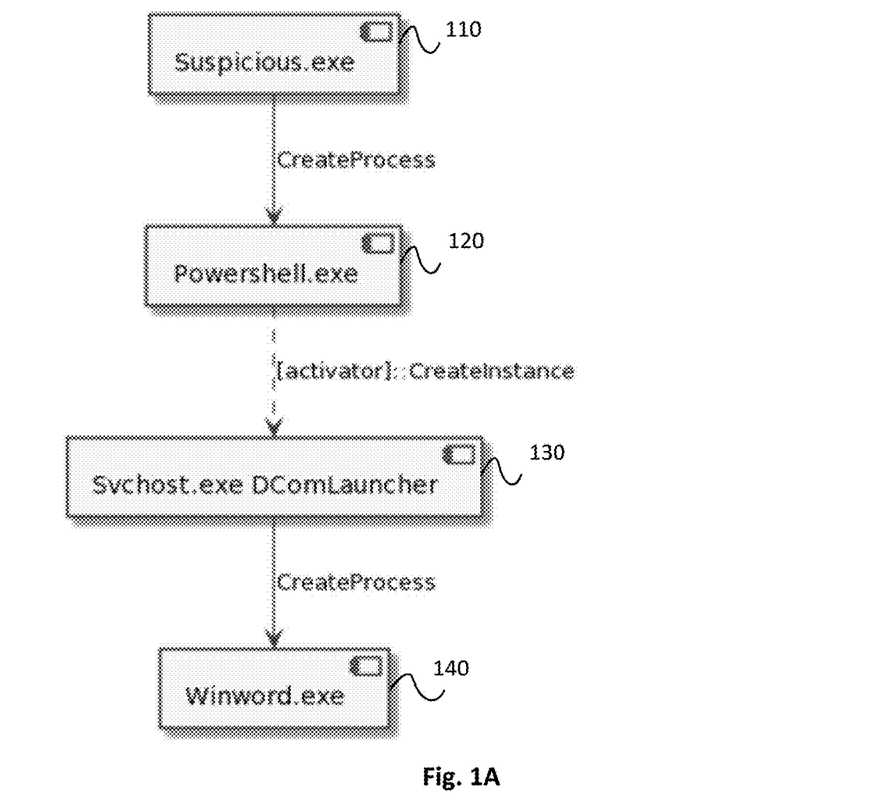
FIG. 1A illustrates an example of an actor process executing a powershell script that uses OLE Automation to launch an executable.

FIG. 1A illustrates an example of an actor process executing a powershell script that uses OLE Automation to launch an executable.

In the example of FIG. 1A, the actor process is an executable 110 named Suspicious.exe. The executable 110 Suspicious.exe launches an executable 120 named Powershell.exe using CreateProcess. A notification for the Process Create Event of executable no Suspicious.exe launching executable 120 Powershell.exe might be

| | |
|---|---|
| Event Id | 1001 |
| Actor | Suspicious.exe |
| Event | creates process |
| Target | powershell.exe |

Executable 120 Powershell.exe communicates with an instance 130 of Svchost.exe hosting the DComLauncher service. In recent versions of Windows®, services, like DComLauncher, run in different instances of Svchost.exe. DCOM is an acronym for Distributed Component Object Model. The instance 130 of Svchost.exe hosting DCom-Launcher, in turn, launches an instance 140 of an executable named Winword.exe using CreateProcess. A notification for the Process Create Event of instance 130 of Svchost.exe launching instance 140 of Winword.exe might be

| | |
|---|---|
| Event Id | 1002 |
| Actor | DCOM Launcher service |
| Event | creates process (via OLE Automation) |
| Target | winword.exe |

Because the executable 110 Suspicious.exe indirectly created the instance 140 of Winword.exe, computer security products do not easily detect the link between executable 120 Powershell.exe and instance 130 of Svchost.exe.

Figure 1B:
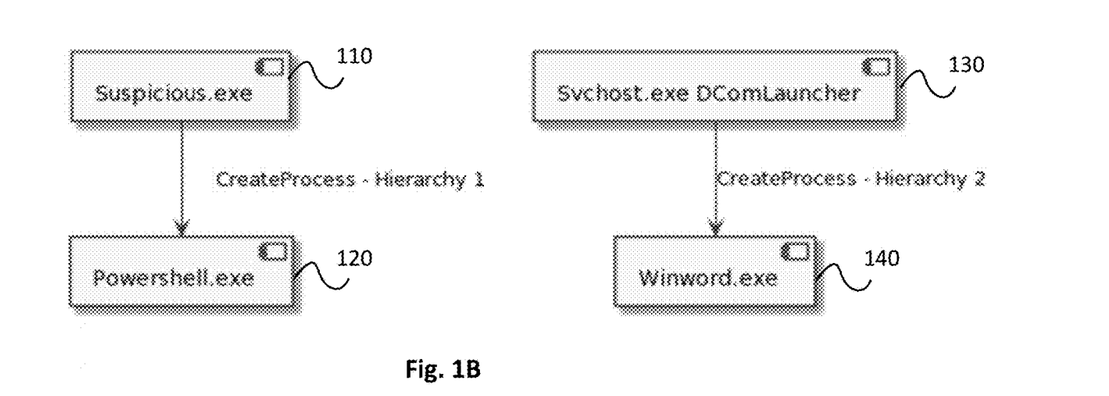
FIG. 1B illustrates hierarchies detected by conventional computer security products, in the absence of detecting a link from the powershell script.

Accordingly, FIG. 1B illustrates hierarchies detected by conventional computer security products, in the absence of detecting a link from the powershell script.

Specifically, conventional computer security products see the two separate hierarchies shown in FIG. 1B. A conventional computer security product detects that executable 110 Suspicious.exe launches an executable 120 Powershell.exe in Hierarchy 1. Further, the conventional computer security product detects that instance 130 of Svchost.exe hosting DComLauncher launches an executable 140 named Winword.exe in Hierarchy 2. That is, the conventional computer security product might not detect any relationship between Hierarchy 1 and Hierarchy 2.

When this instance 140 of executable Winword.exe is used/misused, its launch cannot easily be linked back to the executable no Suspicious.exe.

To address such a situation, conventional computer security products might analyze relationships based on extracting information from the command line in combination with image load events and API (application programming interface) hooking.

There are several issues with such an approach. For example:
1. Command line parsing can require capturing a process creation command line that might not always be available, as in the case of API calls from the code, apart from parsing and obfuscation challenges.
2. Image load events provide information about modules loaded by a process (the responsible actor, in this case) but do not tell what APIs are called from the module, unless API hooking is performed.
3. API hooking is powerful, but it might destabilize a process and is considered intrusive. API hooking is also well-detected by other (e.g., malicious) processes as well.

Working with the combination of these three issues and addressing such malware based on each interop module is complex and still leaves gaps.

Thus, possible methods to establish this link might involve the following steps:
1. Capture a Process Creation event for executable 120 Powershell.exe
2. Capture the command line or the content of the powershell script that executable Powershell.exe 120 executes. Parse the command line or the content to deduce use of OLE Automation APIs to create a COM server process (e.g., Winword.exe).
3. Alternatively, watch for ImageLoad events when the executable Powershell.exe 120 loads a Winword interop dynamic link library (DLL).
4. Hook various COM/RPC services and hook COM/RPC calls to determine that executable Powershell.exe 120 called COM APIs for the CreateInstance method. The parameters would reveal which COM object that executable Powershell.exe 120 is trying to instantiate.
5. Capture Process Create events for executable 140 Winword.exe where the Actor/Parent process is DCom-Launcher Service.
6. Correlate the hooked COM/RPC services and calls and the Process Create event for executable 140 Winword.exe based on their timing and various IDs to deduce that a specific instance of executable Powershell.exe 120 created the specific instance of the executable 140 Winword.exe process.
7. Likewise, do this method for other COM server processes (e.g., Excel®, Office, Powershell) on a case-by-case basis through rules.

Issues with these possible methods include:
1. Capturing the events at each of these steps has challenges: potential rules are too noisy as these events are common processes mostly performing legitimate operations.
2. The possible method involves multiple types of events, e.g., Process Create and Image Load.
3. The possible method involves multiple technologies, e.g., OS drivers and a hooking mechanism.
4. Hooking system services can cause a performance bottleneck and is risky because they are noisy and vital.
5. Capturing command lines might be difficult in many situations. Capturing the content of scripts can involve other related technologies, such as the Windows® antimalware scan interface (AMSI).
6. The timing correlations across the various technologies and sources of information might be difficult and can result in many false positive and/or negatives.
7. Expressing the implementation filters in terms of rules is complex and costly.
8. Case-by-case handling would be complicated and would require maintenance.

Accordingly, some implementations of the present disclosure can detect the indirect creation of processes via OLE Automation and capture the responsible (e.g., real) actor. Some such implementations can deduce process relationships by capturing, analyzing and correlating ETW messages, working them back to the COM calls, and back to what the client process is requesting.

FIG. 2A illustrates an example of an event notification received in some implementations of the present disclosure. As illustrated in FIG. 2A, the messages include a MessageNum field, a Pid field, a Tid field, an ID field, an ActivityID field, a ClientThreadID field, and a Timestamp field. Some messages can include an InterfaceUuid field and a ProcNum field. Some messages can include additional fields, such as an Endpoint field.

Figure 2B:
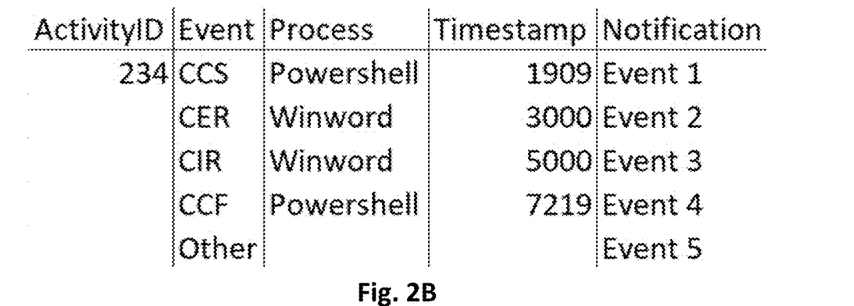
FIG. 2B illustrates an exemplary table for process reattribution generated in some implementations of the present disclosure.

FIG. 2B illustrates an exemplary table for process reattribution generated in some implementations of the present disclosure. The table includes an ActivityID for an active activity. For an active activity, the table can include particular events (CCS, CER, CIR, and CCF, described later), a process that performed the event, a timestamp, and an event notification.

Figure 3:
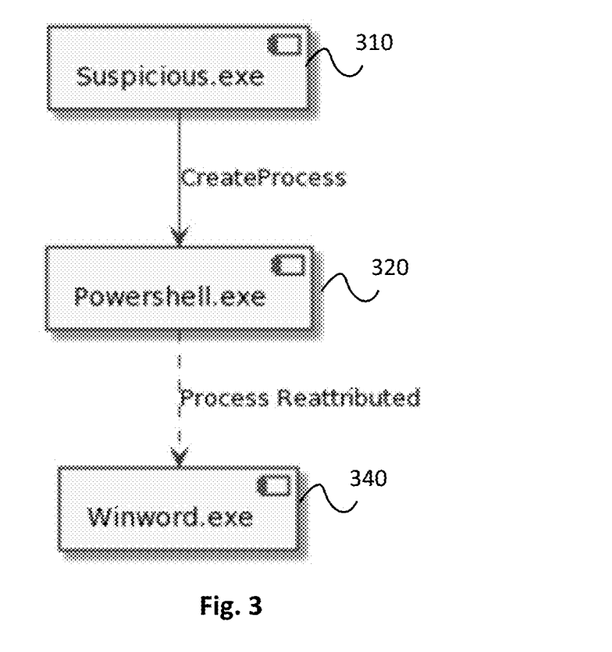
FIG. 3 illustrates an example of a process reattribution event, according to an implementation of the present disclosure.

After analyzing one or more messages as in FIG. 2A and generating a table as in FIG. 2B, some implementations can generate a process reattribution event. FIG. 3 illustrates an example of such a process reattribution event, according to one implementation of the present disclosure.

In FIG. 3, the system has reattributed a process of an instance 340 of executable Winword.exe to executable 320 Powershell.exe. Thus, the link missing in FIG. 1B between executable 120 Powershell.exe and the instance 130 of Svchost.exe hosting DComLauncher has been filled. Returning to FIG. 3, the system has generated a process reattribution event indicating that executable 320 Powershell.exe created an instance 340 of executable Winword.exe through Windows DCOM Launcher service (not pictured).

Therefore, in this disclosure, the phrases "parent process" and "child process" are used to establish a hierarchical relationship, such as between executable 320 Powershell.exe and instance 340 of executable Winword.exe, in view of the reattribution in FIG. 3. However, as noted in FIG. 1A, executable 120 Powershell.exe and instance 140 of executable Winword.exe do not directly share a relationship as "parent process" and "child process."

An example of the process reattribution event notification is as follows:

| Responsible Actor | Powershell.exe |
| Event Reference | Process Create Event ID 1002 |
| Target | winword.exe |

Powershell.exe is a "living off the land" binary (lolbin). Thus, using the Process Reattribution event along with Process Create events for creating Powershell.exe, various implementations of the system can reattribute creation of an instance 340 of executable Winword.exe to its responsible actor, which is an executable named Suspicious.exe 310.

Some implementations of the present disclosure rely on the internal workings of COM and its use of RPC Protocol to work off a stream of ETW RPC events.

Microsoft® COM object initialization and instantiation workflow follows relatively few patterns for any COM component (e.g., Microsoft® Office applications like Word and Excel). The sequence in which various COM interfaces are invoked is fairly standard.

COM/RPC works as a client—server model. Specifically, processes are treated as servers when serving a request. And, when making requests, including requests made to serve an ongoing server call, processes are treated as clients. A server can choose to serve calls synchronously or asynchronously.

A client requests a service first by calling COM Service, which in turn calls the Local Session manager service (a COM server) to check for permissions. The Local Session manager, in turn, calls Policy Service to check for permissions. Once permission is available, COM service then queries an endpoint mapper to get the endpoint that provides the requested service. The RPC service hosts many of these services and facilitates the initial handshake between the client and the endpoint. The endpoint then, based on its implementation, takes this communication forward.

When a process that is also a COM server (e.g., Office applications like Winword.exe) starts, the process registers itself as an endpoint with the endpoint mapper. Then, the process goes on registering various interfaces, with due checks and permissions using existing services, with each interface providing some service. Once this initialization is complete, then any COM component can query and use the interfaces.

Some implementations of this disclosure work over COM calls, as represented by Windows RPC messages. Thus, some implementations can detect cases when Process A creates Process B, which is a COM process, via OLE Automation. The system does not necessarily cover and represent the detailed COM call flow, as explained above. Further, some implementations pick hotspots from the COM call flow that are represented by specific events and their properties. These specific events and properties can be understood and represented by the RPC interaction that takes place between these two processes (and related system services) within a time window.

Figure 4:
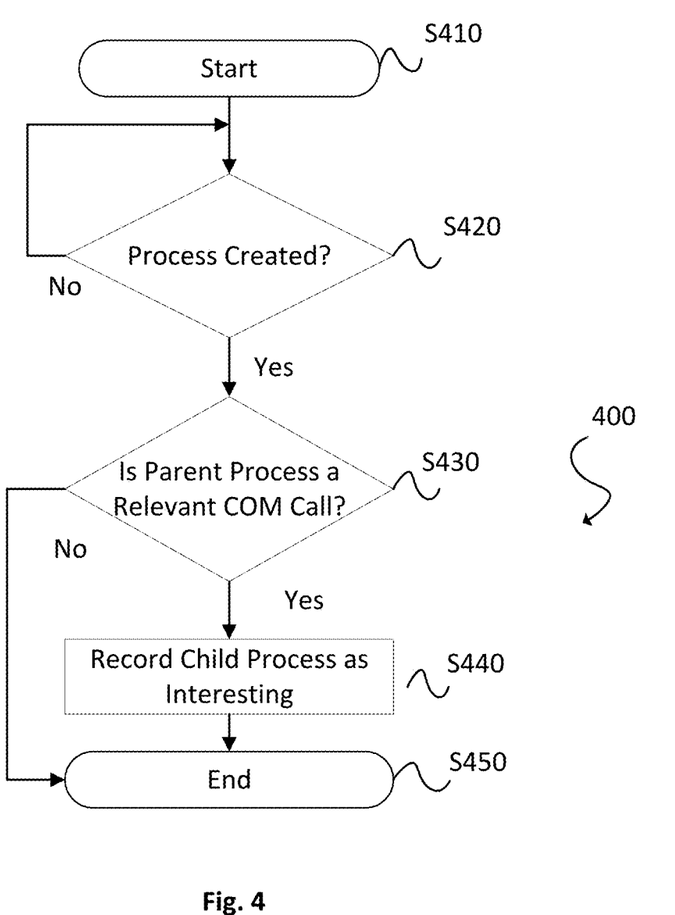
FIG. 4 illustrates an algorithm for monitoring process creation, according to some implementations of the present disclosure.

Various implementations of the system receive and work with the following RPC events:
1. Client call start (CCS) event
2. Client call finish (CCF) event
3. Interface registration (CIR) event
4. Endpoint registration (CER) event FIG. 4 illustrates an algorithm 400 for monitoring process creation, according to some implementations of the present disclosure. The algorithm 400 begins at S410 and proceeds to S420. In S420, a processing unit (described later) determines whether a child process has been created by a parent process. For example, the processing unit might receive a process create event notification indicating that a parent process has created an instance of a child process via OLE automation. Although not so limited, the created process can be Word, Excel, or any Microsoft® Office suite application, for example.

If the processing unit determines that a child process has not been created by a parent process, then the algorithm 400 returns to S420.

If the processing unit determines that a child process has been created by a parent process, then the algorithm 400 advances to S430.

In S430, the processing unit determines whether the parent process is a relevant COM call. For example, the processing unit can determine whether the parent process (or other actor) is DCom Launcher Service as seen from a ProcessInfo (e.g., PROCESS_BASIC_INFORMATION) structure of Windows®. If the processing unit determines the parent process is not a relevant COM call, then the algorithm 400 advances to S450.

If the processing determines the parent process is a relevant COM call, then the algorithm advances to S440.

In S440, the processing unit records the child process as interesting. For example, the processing unit stores an entry for this process in a list of interesting processes. These interesting processes can be candidates for reattribution. The algorithm 400 then advances to S450.

In S450, the algorithm 400 concludes.

Figure 5:
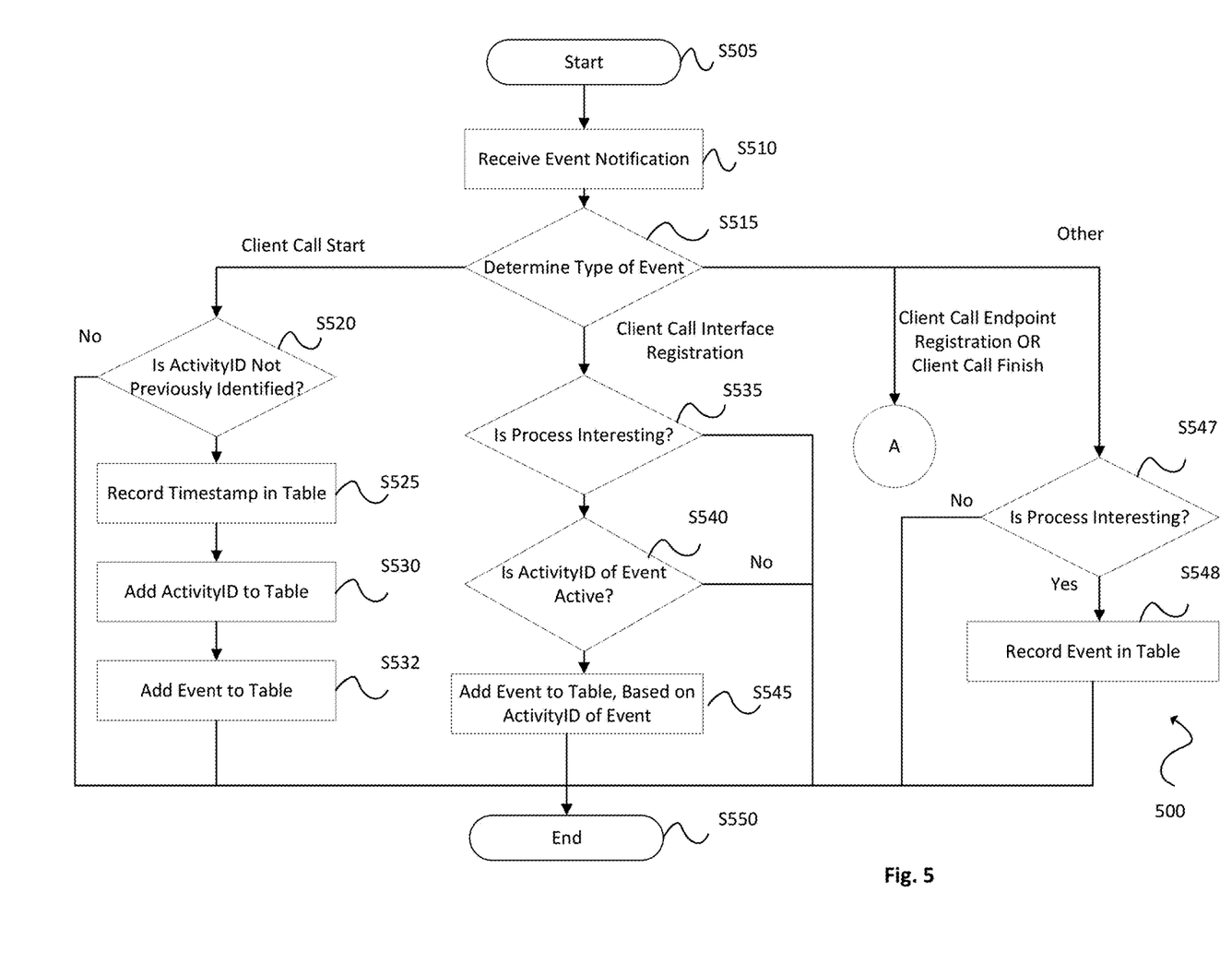
FIG. 5 illustrates an algorithm for event handling, according to some implementations of the present disclosure.

FIG. 5 illustrates an algorithm 500 for event handling, according to some implementations of the present disclosure. In many implementations, the algorithm 500 is performed by a processing unit, described below.

The algorithm 500 begins at S505 and advances to S510.

In S510, the processing unit receives a notification of an ETW event. In many implementations, the event notification has a structure similar to the example of FIG. 2A. The algorithm 500 then advances to S515.

In S515, the processing unit determines a type of the event, based on the ID of the event notification, for example. If the processing unit determines the event is a client call start, then the algorithm 500 advances to S520. If the processing unit determines the event is a client call interface registration, then the algorithm 500 advances to S535. If the processing unit determines the event is a client call endpoint registration or client call finish, then the algorithm 500 advances to off-page connector A.

In S520, the processing unit determines whether it previously identified the Activity ID of the activity underlying the event. For example, the Client Call Start event might be the first event for which the processing unit has identified the Activity ID If the activity underlying the Client Call Start event. Further, it is possible the underlying activity created several events of type Client Call Start, and the processing unit previously has identified the Activity ID for the activity.

In some implementations, the processing unit performs this determination by determining whether a table, such as that of FIG. 2B, includes the Activity ID. If the processing unit determines it previously identified the Activity ID underlying the activity, then the algorithm 500 advances to S550.

If the processing unit determines it has not previously identified the Activity ID, then the algorithm 500 advances to S525.

In S525, the processing unit records a timestamp in many implementations. For example, in some implementations, the processing unit starts a clock as a stopwatch with the initial time being 0. In other implementations, the processing unit records a current time as a timestamp. Various implementations use a timestamp extracted from the event notification received in S510. Many implementations store the timestamp in a table, as shown in FIG. 2B. The algorithm 500 then advances to S530.

In S530, the processing unit adds the Activity ID to the table, an example of which is shown in FIG. 2B, such that the timestamp is associated with the Activity ID. The algorithm 500 then advances to S532.

In S532, the processing unit adds the client call start (CCS) event to the table, again an example of which is shown in FIG. 2B. For example, the processing unit determines the process based on a Process ID or a ClientThreadID extracted from the event notification. For example, in implementations in which the CCS event indicates the sending of a message, the processing unit can determine the process based on the Process ID. In implementations in which the CCS event indicates the reception of a message, the processing unit can determine the process based on the ClientThreadID. The processing unit then adds the CCS event notification and the process (e.g., Powershell.exe) to the table in association with the timestamp added in S530. The algorithm then advances to S550.

Returning to S535, the algorithm advances to S535 if the client call interface registration event notification is received in S510. In S535, the processing unit determines whether the process is interesting. The processing unit can extract the process based on the Process ID or the ClientThreadId from the CIR event notification. For example, in implementations in which the CIR event indicates the sending of a message, the processing unit can extract the process, based on the Process ID. In implementations in which the CIR event indicates the reception of a message, the processing unit can extract the process, based on the ClientThreadID. Many implementations base this determination on the interesting process list generated in FIG. 4. Alternatively, the processing unit can determine whether a parent process of the ClientThreadID is a relevant COM call (e.g., is DCom Launcher Service). If the process is not interesting (e.g., the parent process is not a relevant COM call), then the algorithm 500 advances to S550.

If the process is interesting (e.g., the parent process is a relevant COM call), then the algorithm 500 advances to S540.

In S540, the processing unit extracts the ActivityID from the CIR event notification and determines whether the ActivityID is active. For example, the processing unit determines whether the table, an example of which is shown in FIG. 2B, includes a CCS event for the ActivityID. If the processing unit determines the ActivityID is not active (e.g., is not present in the table), then the algorithm 500 advances to S550.

If the processing unit determines the ActivityID is active (e.g., is present in the table), then the algorithm 500 advances to S545.

In S545, the processing unit adds, to the table, the CIR event, the process, and the CIR event notification in association with the ActivityID. The processing unit also extracts a timestamp from the CIR event notification and adds the timestamp to the table in association with the CIR event. The algorithm 500 then advances to S550.

Returning to S547, the algorithm 500 advances to S547, if another event type was received in S510. The processing unit determines whether the process is interesting. This determination is similar to S535. If the process is not interesting, then the algorithm 500 advances to S550. If the process is interesting, then the algorithm 500 advances to S548.

In S548, the processing unit records the event in the table. For example, the processing unit can store a timestamp, process name, and event notification. This can be based on an ActivityID extracted from the other event notification. Some implementations use this operation to record the timestamp of the first event performed by the child process, if the first event is not of types CER or CIR. The algorithm 500 then advances to S550.

In S550, the algorithm 500 concludes until the processing unit receives another event.

Figure 6:
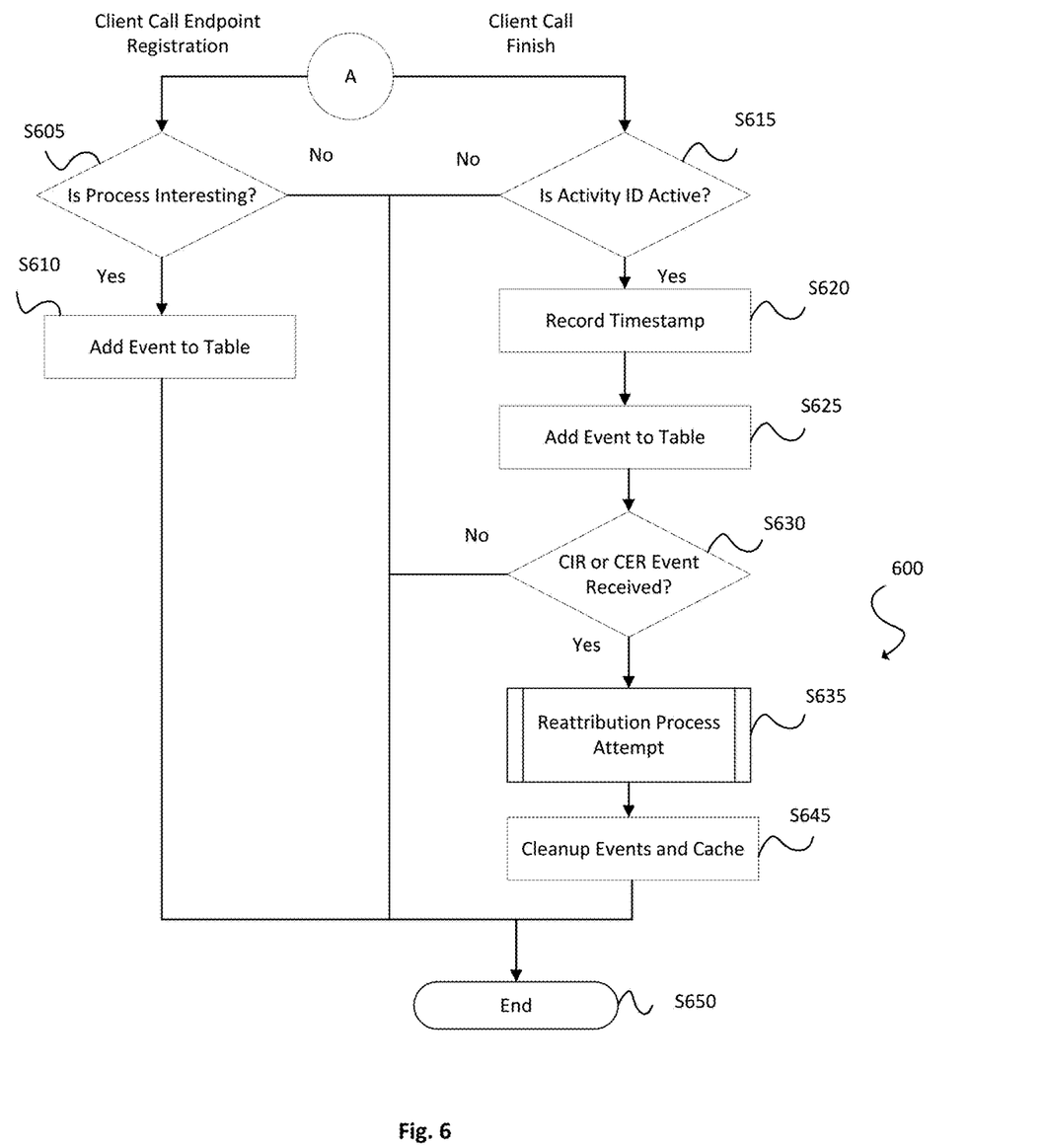
FIG. 6 illustrates an algorithm for handling a client call endpoint registration or client call finish event, according to some implementations of the present disclosure.

FIG. 6 illustrates an algorithm 600 for handling a client call endpoint registration event or client call finish event, according to some implementations of the present disclosure. The algorithm 600 begins at connector A. If the processing unit determines the event is a client call endpoint registration, then the algorithm 600 advances to S605. If the processing unit determines the event is a client call finish, then the algorithm 600 advance to S615.

In S605, the processing unit determines whether the process is interesting (e.g., whether the parent process is a relevant COM call). For example, the processing unit can extract the Process ID or the ClientThreadID from the CER event notification. For example, in implementations in which the CER event indicates the sending of a message, the processing unit can extract the process, based on the Process ID. In implementations in which the CER event indicates the reception of a message, the processing unit can extract the process based on the ClientThreadID. As before, the processing unit can determine whether the process is on the interesting process list and/or whether a parent process of the ClientThreadID is a relevant COM call (e.g., is DCOM Launcher Service). If the processing unit determines the process is not interesting, then the algorithm 600 advances to S650. If the processing unit determines the process is interesting, then the algorithm 600 advances to S610.

In S610, the processing unit extracts the ActivityID and Process ID from the CER event notification and adds, to the table, the process (e.g., Winword) and the CER event notification in association with the ActivityID. The processing unit also extracts a timestamp from the CER event notification and adds the timestamp to the table in association with the CER event. The algorithm 600 then advances to S650.

Returning to S615, the algorithm 600 advances to S615, when the type of the event received in S510 is Client Call Finish. In S615, the processing unit extracts an ActivityID from the event notification and determines whether the activity underlying the CCF event is active. For example, the processing unit determines whether the ActivityID is included in the table, an example of which is shown in FIG. 2B. If the processing unit determines the activity is not active (e.g., is not included in the table), then the algorithm 600 advances to S650. If the processing unit determines the activity is active (e.g., is included in the table), then the algorithm 600 advances to S620.

In S620, the processing unit records a timestamp for the CCF event. For example, the processing unit can extract a timestamp from the CCF event notification. In various implementations, the processing unit stops a clock that began operating as a stopwatch in S525. In other implementations, the processing unit records a current time as a timestamp. The algorithm 600 then advances to S625.

In S625, the processing unit extracts an ActivityID and a ClientThreadID from the CCF event notification and retrieves the table, based on the ActivityID. The processing unit then adds the CCF event to the table in association with the Activity ID. For example, the processing unit adds, to the table, the process, the CCF event, and the CCF event notification in association with the ActivityID.

The algorithm 600 then advances to S630.

In S630, the processing unit determines whether a CIR event or CER event was received for this Activity ID. If the processing unit determines neither a CIR event nor a CER event was received for this Activity ID, then the algorithm 600 advances to S650. If the processing unit determines a CIR event or a CER event was received for this Activity ID, then the algorithm 600 advances to S635.

In S635, the processing unit performs a reattribution process attempt. This reattribution process attempt is discussed in more detail in FIG. 7. The algorithm 600 then advances to S645.

In S645, the processing unit cleans up the table by removing the ActivityID and its associated events, timestamps, and notifications. The algorithm 600 then advances to S650.

In S650, the algorithm 600 concludes.

In addition to the cleanup in S645, the processing unit occasionally removes processes and events from the table and the list of interesting processes. Specifically, the processing unit can remove a process or an event, if a CCS or a CCF event is not received within a predetermined period of time (such as 1 week). The process and/or event removal can be periodic, can be based on memory consumption (e.g., the table or list exceeding a predetermined size), can be based on hardware or software events (e.g., computer start-up, shutdown, or virus scan), or can be random.

Figure 7:
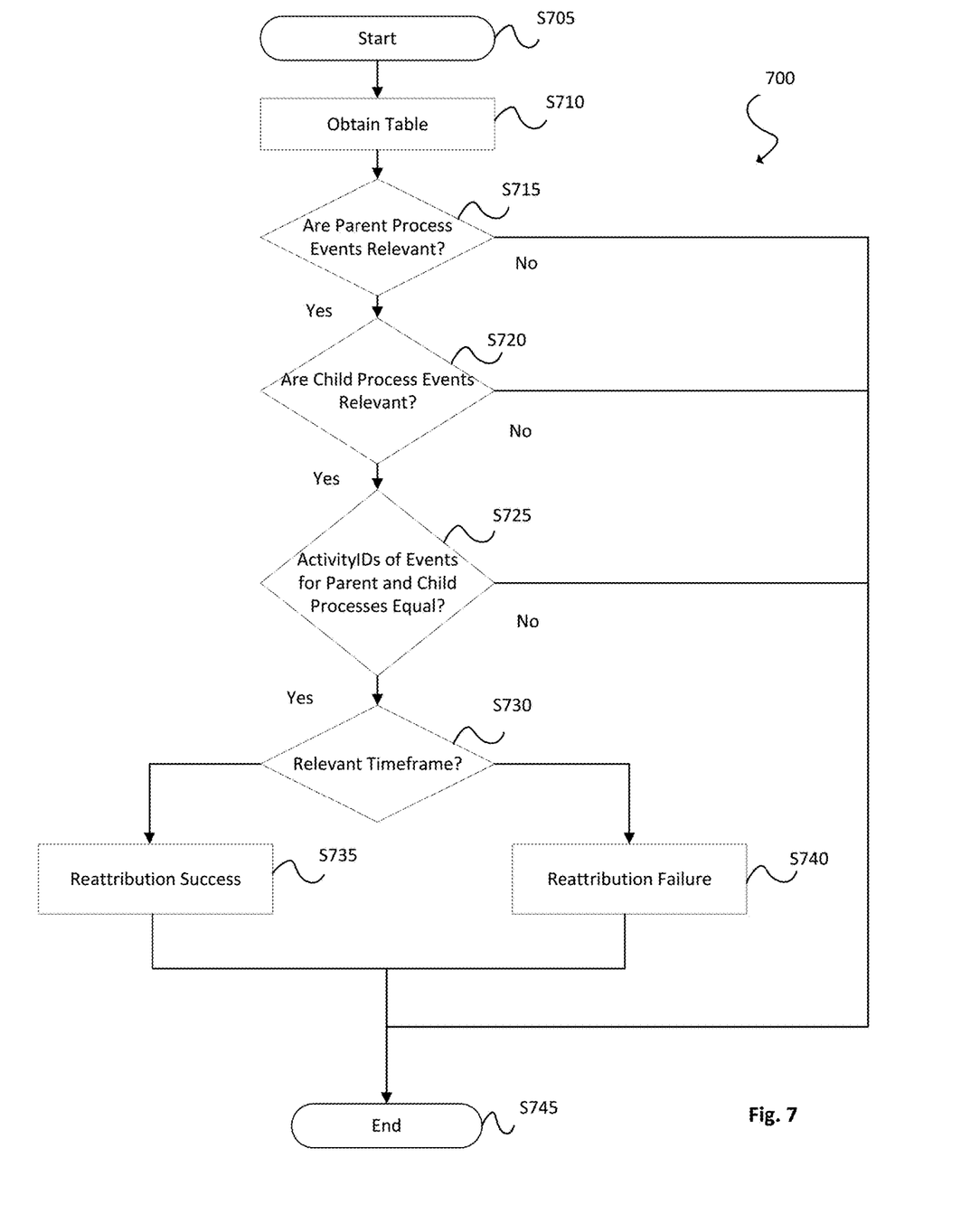
FIG. 7 illustrates an algorithm for OLE automation reattribution, according to some implementations of the present disclosure.

FIG. 7 illustrates an algorithm 700 for OLE automation reattribution, according to some implementations of the present disclosure. The algorithm 700 begins at S705 and advances to S710.

In S710, the processing unit obtains the table, based on the ActivityID. The algorithm 700 then advances to S715.

In S715, the processing unit determines whether the parent process events are relevant. For example, the processing unit can determine whether the table includes Client Call Start and Client Call Finish events from the same parent process (e.g., Powershell).

The processing unit also can determine whether the Client Call Start Interface of the parent process is ISCMLocalActivator and the method is GetClassObject. In various implementations, the Interface can additionally or alternatively be other Activator interfaces (e.g., IRemoteSCMActivator, ILocalSystemActivator, and IClassActivator, and IMachineLocalActivator). The processing unit can determine the Interface based on, for example, the Interface ID field from the Client Call Start and/or Client Call Finish event notifications. The processing unit can determine the method based the ProcNum field of the CCS and/or CCF event notifications.

In some implementations, the processing unit determines the parent process events are relevant, if the table includes Client Call Finish and Client Call Start events from the same parent process, the Client Call Start Interface of the parent process is ISCMLocalActivator or other Activator interface, and the method is GetClassObject.

If the processing unit determines the parent process events are not relevant, then the algorithm 700 advances to S745. If the processing unit determines the parent process events are relevant, then the algorithm 700 advance to S720.

In S720, the processing unit determines whether the child process events are relevant.

For example, the processing unit can determine whether the first event notification received from the child process (e.g., Winword) was received after the Client Call Start event was received from the parent process (e.g., Powershell). For example, the processing unit can determine whether the child process was initialized for the first time after the parent process generated the CCS event. In some implementations, the processing unit extracts the timestamp of the CCS event from the table based on the ActivityID. Then, the processing unit can extract the timestamp from any Client Interface Registration, Client Endpoint Registration, other event notifications for the child process and compare the timestamps of the child process events with the timestamp of the Client Call Start event.

In addition, the processing unit can determine whether the table contains a Client Interface Registration event from the child process. In some implementations, the processing unit determines, based on the ActivityID, whether a Client Interface Registration event is associated with the ActivityID in the table.

The processing unit also can determine if the first event for the child process within the event filtering (i.e., CCS, CIR, CER, CCF) is a CER event. That is, the processing unit can determine whether the child process registered its first endpoint after the CCS event by the parent process. For example, the processing unit can extract, from the table, the timestamps of the CER and CIR events based on the ActivityID and determine whether the first event for the child process is a CER event, based on the timestamps. In other implementations, a flag or bit is set, when the processing unit first receives a CER, CIR, CCS, or CCF event notification for the child process (e.g., in S545 or S610).

Further, the processing unit can determine whether the last event for the child process within a time window is a CIR event and the interface is IClassFactory or IClassFactory2. For example, the processing unit can extract from the table the timestamps of the CCF, CIR, and CER events based on the ActivityID. The processing unit can compare the timestamp of the CCF event with the timestamps for CIR and CER events. If a CIR event has the latest timestamp among the CIR and CER events and before the timestamp of the CCF event, then the processing unit determines that the last event for the child process is the CIR event. The processing unit then extracts the CIR event notification from the table and determines whether the interface for the CIR event is IClassFactory or IClassFactory2, based on an Interface ID from the CIR event notification.

In some implementations, the processing unit determines the child process events are relevant, if the first event notification from the child process was received by the processing unit after the CCS event from the parent process, the table includes a CIR event from the child process, the first event for the child process within the event filtering is a CER event, the last event for the child process within the time window is the CIR event, and the interface for the CIR event is IClassFactory or IClassFactory2.

If the processing unit determines the child process events are relevant, then the algorithm 700 advances to S725. If the processing unit determines the child process events are not relevant, then the algorithm 700 advances to S745.

In S725, the processing unit determines whether the ActivityId of the last event of the child process within the time window is equal to the ActivityId of the CCS event of the parent process. For example, the processing unit compares the ActivityId of the CIR event notification discussed above regarding S720 to the ActivityId of the CCS event notification of the parent process. If the processing unit determines the ActivityIds are not equal, then the algorithm 700 advances to S745.

If the processing unit determines that the ActivityIds are equal, then the algorithm 700 advances to S730.

Some implementations of S725 use the ActivityId of the CCF event instead of the ActivityID of the CCS event.

In S730, the processing unit determines whether the CER event and all CIR events of the child process are performed in a relevant timeframe. In many implementations of the present disclosure, this timeframe is defined by a time window established by the CCF and CCS events of the parent process. For example, if the processing unit determines the timestamps of the CER event notification and all CIR event notifications in the table are between the timestamps of the CCS and CCF event notifications, then the processing unit determines the CER event and all CIR events of the child process are performed in the relevant timeframe. If the processing unit determines the CER event and all CIR events of the child process are in the relevant time window, then the algorithm 700 advances to S735. If the processing unit determines the CER event and all CIR events of the child process are not in the time window, then the algorithm 700 advances to S740.

In S735, the processing unit attributes the child process to the parent process. In some implementations, the processing unit generates a reattribution event notification as set forth above. The algorithm 700 then advances to S745.

In S740, the processing unit fails to reattribute the child process to the parent process. The algorithm then advances to S745.

In S745, the algorithm 700 concludes.

Some implementations replace the table of FIG. 2B with three different lists. For example, the first list can be a single global list that tracks which activities are active. The second list can be a single global list that collects ETW events corresponding to active activities. The third list exists for each process. So, in the case, there is a list attached to a process, it also contains the events.

Thus, the processing unit can detect if the parent process launched the child process via the OLE Automation framework.

In some implementations, the reattribution is output via a user output interface, as described later. For example, a display (e.g., a monitor) can display an indication of the reattribution. In some such implementations, the display can illustrate interesting events emanating from a single point. The display also can de-emphasize a display of processes that were innocent victims but were considered part of an attack.

In many implementations, the processing unit executes a malware scanner to scan the parent of the parent process (e.g., Suspicious.exe), based on the reattribution.

The reattribution can reduce the number of false positives or false negatives from malware scanning, due to the correct attribution of responsibility to the parent process (e.g., Powershell.exe) and, more accurately, the parent process's parent (e.g., Suspicious.exe).

Further, future system monitoring can be improved by widely monitoring Suspicious.exe and capturing its events.

In some implementations, the present advancement makes it easier to correlate low-level events to construct descriptions of high-level behavior.

Further, in some implementations, software components that analyze events can reduce processing of process relationships, because the innovation distills some of these relationships.

The events filtered by FIGS. 5-7 are low level and can cover many methods that a malicious process might employ. Some implementations can avoid limitations regarding commands and technologies used (e.g., Power shell/CScript/.NET) or obfuscation.

Many implementations can work across different execution methods, such as system utilities and Win32 APIs.

Many implementations employ events from Windows ETW Provider for RPC. Because Windows ETW provider for RPC is a Windows® component, new code is not necessarily needed for event tracing. Further, the ETW Provider is likely to be available in a system using the Windows® OS.

In addition, the Windows ETW Provider is a user-mode provider. Thus, in many implementations, drivers and kernel modules need not be involved.

Because Windows ETW Provider works asynchronously, many implementations cause minimal performance impact.

The Windows ETW Provider operates at the level of the RPC protocol which is low. Hence, the ETW Provider can see many of the COM activities.

Further, because ETW RPC events are delivered in order and on a single timeline, it can be trivial to do time-based correlations.

Figure 8:
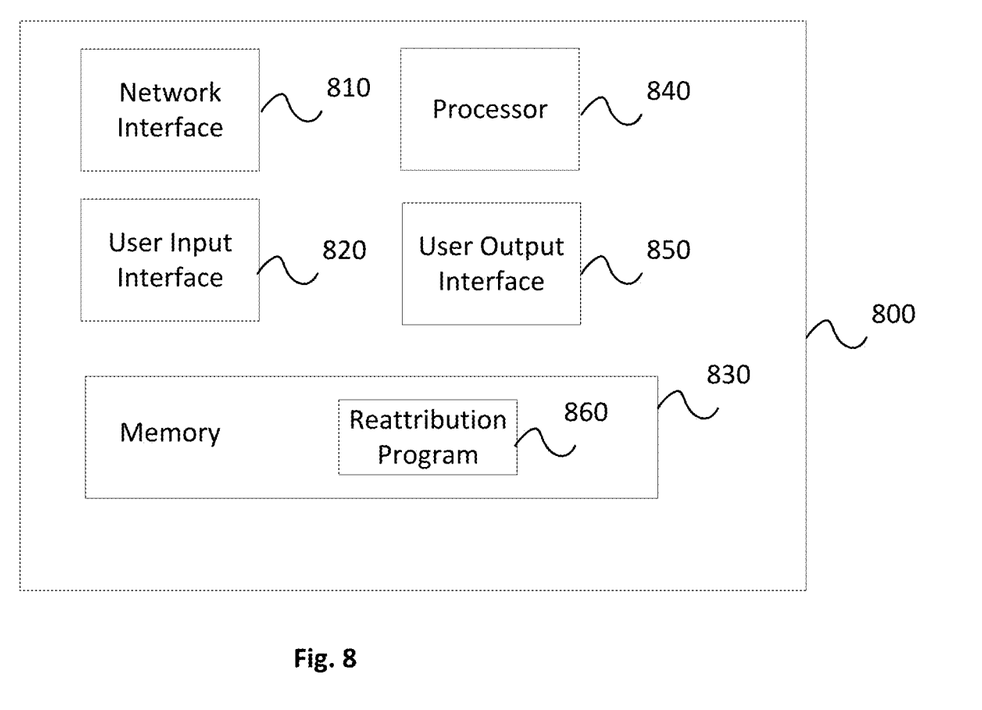
FIG. 8 illustrates a computing device, according to an implementation of the present disclosure.

FIG. 8 illustrates a computing device 800, according to an implementation of the present disclosure.

Although illustrated within a single housing, computing device 800 can be distributed across plural housings or sub-systems that cooperate in executing program instructions. In some implementations, the computing device 800 can include one or more blade server devices, standalone server devices, personal computers (including laptop computers and tablet computers), routers, hubs, switches, bridges, firewall devices, intrusion detection devices, mainframe computers, network-attached storage devices, smartphones and other mobile telephones, and other computing devices. Although the system executes the Windows® OS in many implementations, the system hardware can be configured according to a Symmetric Multi-Processing (SMP) architecture or a Non-Uniform Memory Access (NUMA) architecture.

The computing device 800 can include a network interface 810 that provides one or more communication connections and/or one or more devices that allow for communication between the computing device 800 and other computing systems (not shown) over a communication network or collection of networks (not shown) or the air. The network interface can communicate using near-field communications (NFC), Wi-Fi™, Bluetooth, Ethernet, cellular (e.g., 5G), facsimile, or any other wired or wireless interface.

The computing device 800 can also include a user input interface 820 that receives inputs from a human. The user input interface can be or include a mouse, a touchpad, a keyboard, a touchscreen, a trackball, a camera, a microphone, a joystick, a game controller, a scanner, or any other input device.

The computing device 800 can include a memory 830, also termed a "storage." The memory 830 can include or be one or more computer-readable storage media readable by a processor 840 and that store software. The memory 830 can be implemented as one storage device and can also be implemented across multiple co-located or distributed storage devices or sub-systems. The memory 830 can include additional elements, such as a controller, that communicate with the processor 840. The memory 830 can also include storage devices and/or sub-systems on which data and/or instructions are stored. The computing device 800 can access one or more storage resources to access information to carry out any of the processes indicated in this disclosure and, in particular, FIGS. 4-7.

The memory 830 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a hard drive, a cache memory, a flash memory, a removable disk, or a tape reel. The memory 830 can be or include resistive RAM (RRAM) or a magnetoresistive RAM (MRAM). Other implementations are possible.

A reattribution program 860 stored in memory 830 can include routines for at least partially performing at least one of the processes illustrated in FIGS. 4-7 and can be implemented in program instructions. Further, the software, when executed by the computing device 800 in general or the processor 840 specifically, can direct, among other functions, the computing device 800 or the processor 840 to perform the reattribution as described herein.

The computing device 800 can include a processor 840 (e.g., a processing unit). Processor 840 can be or include one or more hardware processors and/or other circuitry that retrieve and execute software from the memory 830. The processor 840 can be implemented within one processing device, chip, or package and can also be distributed across multiple processing devices, chips, packages, or sub-systems that cooperate in executing program instructions. In some implementations, the processor 840 is or includes a Graphics Processing Unit (GPU).

The processor 840 can have any register size, such as a 32-bit register or a 64-bit register, among others. Processor 840 can include multiple cores. Implementations of processor 840 are not limited to any particular number of threads. Processor 840 can be fabricated by any process technology, such as 14 nm process technology.

The computing device 800 can also include a user output interface 850 that outputs information to a human user. The user output interface 850 can be or include a display (e.g., a screen), a touchscreen, speakers, a printer, or a haptic feedback unit. In many implementations, user output interface 850 can be combined with user input interface 820. For example, some implementations include a touchscreen or headset including headphones and a microphone.

In implementations including multiple computing devices, a server of the system or, in a serverless implementation, a peer can use one or more communications networks that facilitate communication among the computing devices. For example, the one or more communications networks can include or be a local area network (LAN) or wide area network (WAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, and cache memory, and to transitory storage media, such as carrier waves or propagating signals.

Aspects of the system for process reattribution can be implemented in various manners (e.g., as a method, a system, a computer program product, or one or more computer-readable storage media). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various embodiments, different operations and portions of the operations of the algorithms described can be performed by different processing units. Furthermore, aspects of the present disclosure can take the form of a computer program product embodied in one or more computer-readable media having computer-readable program code embodied, e.g., encoded or stored, thereon. In various implementations, such a computer program can, for example, be downloaded (or updated) to existing devices and systems or be stored upon manufacture of these devices and systems.

The detailed description presents various descriptions of specific implementations. The innovations described can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain embodiments can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve the developer's specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the drawings can be implemented as stand-alone modules (e.g., a device with associated components and circuitry configured to perform a specific application or function) or implemented as plug-in modules into application specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions on one chip substrate. Other embodiments can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. Such information can be varied considerably. For example, various modifications and changes can be made to arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in any manner. Along similar design alternatives, the illustrated components, modules, and elements of the drawings can be combined in various possible configurations within the scope of this disclosure. In certain cases, it might be clearer to describe one or more of the functionalities of a given set of flows by referencing a limited number of electrical elements. The electrical circuits of the drawings and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example A1, an apparatus includes a memory that stores instructions; and a processing unit configured to execute the instructions to identify a created process, to receive a notification of a first event for an ancestor process and a notification for a second event for the created process, the notification of the first event indicating a first ActivityID and a first ID, the notification of the second event indicating a second ActivityID and a second ID, the first ID being different from the second ID, to perform a first determination that the created process was created by a component object model (COM) call, at least in part based on the second ID, and to perform a second determination that the ancestor process indirectly created the created process, at least in part based on the first and second ActivityIDs and the first determination.

Example A2 is the apparatus of Example A1, wherein the processing unit further is configured to execute a malware scan of a parent of the ancestor process or to cause a display of the ancestor process, at least in part based on the second determination.

Example A3 is the apparatus of any of Examples A1-A2, wherein the second determination is at least in part based on an interface and a method indicated by the notification of the first event.

Example A4 is the apparatus of any of Examples A1-A3, wherein the second determination is at least in part based on a determination that the notification of the second event indicates an interface of IClassFactory or IClassFactory2.

Example A5 is the apparatus of any of Examples A1-A4, wherein the processing unit further is configured to receive a notification of a third event for the ancestor process, the notification of the third event indicating a third ID, the third ID being different from the first ID and the second ID, and the second determination is at least in part based on a determination that the second event occurred before the third event.

Example A6 is the apparatus of any of Examples A1-A5, wherein the processing unit further is configured to receive a notification of a third event for the ancestor process, the notification of the third event indicating a third ID, the third ID being different from the first ID and the second ID, and the second determination is at least in part based on a determination that the second event occurred between the first and third events.

Example A7 is the apparatus of any of Examples A1-A6, wherein the processing unit further is configured to receive a notification of a fourth event for the created process, the notification of the fourth event indicating a fourth ID, the fourth ID being different from the first ID and the second ID, and the second determination is at least in part based on a determination that the fourth event occurred after the first event.

In Example C1, a non-transitory, computer-readable medium is encoded with instructions that, when executed by a computer, causes the computer to perform operations including: identifying a created process; receiving a notification of a first event for an ancestor process and a notification for a second event for the created process, the notification of the first event indicating a first ActivityID and a first ID, the notification of the second event indicating a second ActivityID and a second ID, the first ID being different from the second ID; performing a first determination that the created process was created by a component object model (COM) call, at least in part based on the second ID; and performing a second determination that the ancestor process indirectly created the created process, at least in part based on the first and second ActivityIDs and the first determination.

Example C2 is the medium of Example C1, the operations further comprising: executing a malware scan of a parent of the ancestor process or causing a display of the ancestor process, at least in part based on the second determination.

Example C3 is the medium of any of Examples C1-C2, wherein the second determination is at least in part based on an interface and a method indicated by the notification of the first event.

Example C4 is the medium of any of Examples C1-C3, wherein the second determination is at least in part based on a determination that the notification of the second event indicates an interface of IClassFactory or IClassFactory2.

Example C5 is the medium of any of Examples C1-C48, the operations further comprising: receiving a notification of a third event for the ancestor process, the notification of the third event indicating a third ID, the third ID being different from the first ID and the second ID, wherein the second determination is at least in part based on a determination that the second event occurred before the third event.

Example C6 is the medium of any of Examples C1-C5, the operations further comprising: receiving a notification of a third event for the ancestor process, the notification of the third event indicating a third ID, the third ID being different from the first ID and the second ID, wherein the second determination is at least in part based on a determination that the second event occurred between the first and third events.

Example C7 is the medium of any of Examples C1-C6, the operations further comprising: receiving a notification of a fourth event for the created process, the notification of the fourth event indicating a fourth ID, the fourth ID being different from the first ID and the second ID, wherein the second determination is at least in part based on a determination that the fourth event occurred after the first event.

In Example M1, a method is implemented by a computing device, the method including: identifying a created process; receiving a notification of a first event for an ancestor process and a notification for a second event for the created process, the notification of the first event indicating a first ActivityID and a first ID, the notification of the second event indicating a second ActivityID and a second ID, the first ID being different from the second ID; performing a first determination that the created process was created by a component object model (COM) call, at least in part based on the second ID; and performing a second determination that the ancestor process indirectly created the created process, at least in part based on the first and second ActivityIDs and the first determination.

Example M2 is the method of Example M1, further comprising: executing a malware scan of a parent of the ancestor process or causing a display of the ancestor process, at least in part based on the second determination.

Example M3 is the method of any of Examples M1-M2, wherein the second determination is at least in part based on an interface and a method indicated by the notification of the first event.

Example M4 is the method of any of Examples M1-M3, wherein the second determination is at least in part based on a determination that the notification of the second event indicates an interface of IClassFactory or IClassFactory2.

Example M5 is the method of any of Examples M1-M4, further comprising: receiving a notification of a third event for the ancestor process, the notification of the third event indicating a third ID, the third ID being different from the first ID and the second ID, wherein the second determination is at least in part based on a determination that the second event occurred before the third event.

Example M6 is the method of any of Examples M1-M5, further comprising: receiving a notification of a third event for the ancestor process, the notification of the third event indicating a third ID, the third ID being different from the first ID and the second ID, wherein the second determination is at least in part based on a determination that the second event occurred between the first and third events.

Example M7 is the method of any of Examples M1-M6, further comprising: receiving a notification of a fourth event for the created process, the notification of the fourth event indicating a fourth ID, the fourth ID being different from the first ID and the second ID, wherein the second determination is at least in part based on a determination that the fourth event occurred after the first event.

We claim:

1. An apparatus comprising:
   interface circuitry;
   machine-readable instructions; and
   at least one processor circuit to be programmed by the machine-readable instructions to:

capture a first event message for a first event in an event log, the first event message including a first ID of the first event, and a first timestamp;

capture a second event message for a second event in the event log, the second event message including a second ID of the second event, the second ID different than the first ID, and a second timestamp occurring after the first timestamp;

identify a second process based on the second event message;

determine that the second process was created by a component object model (COM) call, at least in part based on the second ID;

determine that a first process initiated the COM call, at least in part based on the first event message and the second event message; and execute a malware scan of a parent of the first process, at least in part based on the determination that the first process initiated the COM call.

2. The apparatus of claim 1, wherein one or more of the at least one processing circuit is to cause display of the first process, at least in part based on the determination that the first process initiated the COM call.

3. The apparatus of claim 1, wherein, to determine that the first process initiated the COM call, one or more of the at least one processor circuit is to parse a command line or a content of the first process and determine the first process created a COM server process, based on the parsed command line or parsed content.

4. The apparatus of claim 1, wherein one or more of the at least one processor circuit is to determine that the first process initiated the COM call based on a determination that the second event message indicates an interface of IClassFactory or IClassFactory2.

5. The apparatus of claim 1, wherein one or more of the at least one processor circuit is to:

identify a third event for the first process, the third event having a third ID different than the first ID and the second ID; and determine the first process initiated the COM call based on a determination that the second event occurred before the third event.

6. The apparatus of claim 1, wherein one or more of the at least one processor circuit is to:

identify a fourth event for the second process, the fourth event having a fourth ID different than the first ID and the second ID; and determine that the first process initiated the COM call based on a determination that the fourth event occurred after the first event.

7. The apparatus of claim 1, wherein one or more of the at least one processor circuit is to determine that the first process initiated the COM call based on the first ID, the second ID, the first timestamp, and the second timestamp.

8. At least one non-transitory computer-readable medium comprising computer-readable instructions to cause at least one processor circuit to at least:

analyze a first event message from an event log, the first event message including a first ID of a first event and a first timestamp;

analyze a second event message from an event log, the second event message including a second ID of a second event and a second timestamp, the second ID different than the first ID and the second timestamp after the first timestamp;

identify a second process based on the second event message;

determine that the second process was created by a component object model (COM) call, at least in part based on the second ID;

determine that a first process initiated the COM call, at least in part based on the first event message and the second event message; and execute a malware scan of a parent of the first process, at least in part based on the determination that the first process initiated the COM call.

9. The at least one non-transitory computer-readable medium of claim 8, wherein the computer-readable instructions are to cause one or more of the at least one processor circuit to:

cause a display of the first process, at least in part based on the determination that the first process initiated the COM call.

10. The at least one non-transitory computer-readable medium of claim 8, wherein the computer-readable instructions are to cause one or more of the at least one processor circuit to parse a command line or a content of the first process and determine that the first process created a COM server process, based on the parsed command line or parsed content, to determine that the first process initiated the COM call.

11. The at least one non-transitory computer-readable medium of claim 8, wherein the computer-readable instructions are to cause one or more of the at least one processor circuit to determine that the first process initiated the COM call based on a determination that the second event message indicates an interface of IClassFactory or IClassFactory2.

12. The at least one non-transitory computer-readable medium of claim 8, wherein the computer-readable instructions are to cause one or more of the at least one processor circuit to:

identify a third event for the first process, the third event having a third ID different than the first ID and the second ID; and determine that the first process initiated the COM call based on a determination that the second event occurred before the third event.

13. The at least one non-transitory computer-readable medium of claim 8, wherein the computer-readable instructions are to cause one or more of the at least one processor circuit to:

identify a fourth event for the second process, the fourth event having a fourth ID different than the first ID and the second ID; and determine the first process initiated the COM call based on a determination that the fourth event occurred after the first event.

14. The at least one non-transitory computer-readable medium of claim 8, wherein the computer-readable instructions are to cause one or more of the at least one processor circuit to determine that the first process initiated the COM call based on the first ID, the second ID, the first timestamp, and the second timestamp.

15. A method implemented by a computing device, the method comprising:

capturing a first event message for a first event in an event log, the first event message including a first ID of the first event, and a first timestamp;

capturing a second event message for a second event in the event log, the second event message including a second ID of the second event, the second ID different than the first ID, and a second timestamp occurring after the first timestamp;

identifying a second process based on the second event message;

determining that the second process was created by a component object model (COM) call, at least in part based on the second ID;

determining that a first process initiated the COM call, at least in part based on the first event message and the second event message; and executing a malware scan of a parent of the first process, at least in part based on the determination that the first process initiated the COM call.

16. The method of claim 15, further including causing a display of the first process, at least in part based on the determination that the first process initiated the COM call.

17. The method of claim 15, wherein determining the first process initiated the COM call includes parsing a command line or a content of the first process and determining the first process created a COM server process based on the parsed command line or parsed content.

18. The method of claim 15, wherein determining the first process initiated the COM call is based on a determination that the second event message indicates an interface of IClassFactory or IClassFactory2.

19. The method of claim 15, further including identifying a third event for the first process, the third event having a third ID different than the first ID and the second ID, wherein determining that the first process initiated the COM call includes determining that the second event occurred before the third event.

20. The method of claim 15, further including identifying a fourth event for the second process, the fourth event having a fourth ID different than the first ID and the second ID, wherein determining that the first process initiated the COM call includes determining that the fourth event occurred after the first event.

* * * * *

UNITED STATES PATENT AND TRADEMARK OFFICE
CERTIFICATE OF CORRECTION

| | | |
|---|---|---|
| PATENT NO. | : 12,216,760 B2 | Page 1 of 1 |
| APPLICATION NO. | : 17/514437 | |
| DATED | : February 4, 2025 | |
| INVENTOR(S) | : Kumar et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 424 days.

Signed and Sealed this
Twenty-fourth Day of June, 2025

Coke Morgan Stewart
*Acting Director of the United States Patent and Trademark Office*